United States Patent
Gunjima et al.

(10) Patent No.: US 9,561,703 B2
(45) Date of Patent: Feb. 7, 2017

(54) VEHICLE AIR-CONDITIONING DEVICE

(75) Inventors: Munehisa Gunjima, Tokyo (JP); Hiroki Murakami, Tokyo (JP)

(73) Assignee: MITSUBISHI ELECTRIC CORPORATION, Chiyoda-ku, Tokyo (JP)

(*) Notice: Subject to any disclaimer, the term of this patent is extended or adjusted under 35 U.S.C. 154(b) by 503 days.

(21) Appl. No.: 14/113,025

(22) PCT Filed: Jun. 1, 2011

(86) PCT No.: PCT/JP2011/003073
§ 371 (c)(1),
(2), (4) Date: Oct. 21, 2013

(87) PCT Pub. No.: WO2012/164619
PCT Pub. Date: Dec. 6, 2012

(65) Prior Publication Data
US 2014/0033752 A1  Feb. 6, 2014

(51) Int. Cl.
*F25D 17/04* (2006.01)
*F25D 21/06* (2006.01)
(Continued)

(52) U.S. Cl.
CPC .......... *B60H 1/00021* (2013.01); *B60H 1/008* (2013.01); *B60H 1/00207* (2013.01);
(Continued)

(58) Field of Classification Search
CPC ............ B60H 1/00021; B60H 1/00207; B60H 1/00371; B60H 1/00849; B60H 2001/00221; B61D 27/0072
(Continued)

(56) References Cited

U.S. PATENT DOCUMENTS 4,437,608 A * 3/1984 Smith ................. F24F 11/0001
165/246
4,584,846 A * 4/1986 Uchida .............. B60H 1/00064
454/160
(Continued)

FOREIGN PATENT DOCUMENTS

DE 102008019880 A1 11/2008
EP 0684172 A1 11/1995
(Continued)

OTHER PUBLICATIONS

The extended European Search Report issued on Nov. 28, 2014, by the European Patent Office in corresponding European Application No. 11866826.8-1756. (6 pages).
(Continued)

*Primary Examiner* — Henry Crenshaw
(74) *Attorney, Agent, or Firm* — Buchanan Ingersoll & Rooney PC

(57) ABSTRACT

In vehicle air-conditioning devices including a refrigerant circuit having a compressor, an outdoor heat exchanger, an expansion device, and an indoor heat exchanger that are connected by refrigerant pipes to form a refrigeration cycle; an indoor air-sending device that supplies air to the indoor heat exchanger; and an outdoor air-sending device that supplies air to the outdoor heat exchanger, the refrigerant circuit is installed under the floor of a vehicle and uses carbon dioxide as the refrigerant.

7 Claims, 3 Drawing Sheets

(51) Int. Cl.
*F25C 1/00* (2006.01)
*B60H 1/32* (2006.01)
*B60H 1/00* (2006.01)
*G05D 23/00* (2006.01)
*B64D 13/00* (2006.01)
*B61D 27/00* (2006.01)

(52) U.S. Cl.
CPC ..... *B60H 1/00371* (2013.01); *B60H 1/00849* (2013.01); *B61D 27/0072* (2013.01); *B60H 2001/00221* (2013.01)

(58) Field of Classification Search
USPC ...... 62/186, 151, 176.1, 236, 244, 333, 428, 62/89; 165/202; 236/13; 454/75
See application file for complete search history.

(56) References Cited

U.S. PATENT DOCUMENTS

| | | | |
|---|---|---|---|
| 5,575,453 A | 11/1996 | Dion | |
| 5,784,893 A * | 7/1998 | Furuhama | C09K 5/041 62/333 |
| 6,860,112 B1 * | 3/2005 | Kobayashi | B61D 27/0018 454/105 |
| 2001/0035286 A1 * | 11/2001 | Kobayashi | B60H 1/3207 165/202 |
| 2003/0041617 A1 * | 3/2003 | Vetter | B60H 1/00335 62/428 |
| 2003/0056529 A1 * | 3/2003 | Kakehashi | B60H 1/3225 62/186 |
| 2003/0056531 A1 * | 3/2003 | Nishida | B60H 1/00064 62/244 |
| 2004/0200610 A1 * | 10/2004 | Hara | B60H 1/00314 165/202 |
| 2005/0061497 A1 * | 3/2005 | Amaral | B60H 1/00278 165/202 |
| 2006/0229009 A1 * | 10/2006 | Illing | B60H 1/008 454/75 |
| 2007/0295017 A1 * | 12/2007 | Pannell | B60H 1/00364 62/236 |
| 2009/0318068 A1 * | 12/2009 | Iida | B60H 1/00742 454/75 |

FOREIGN PATENT DOCUMENTS

| | | | |
|---|---|---|---|
| JP | 59-50812 U | | 4/1984 |
| JP | 60-89008 U | | 6/1985 |
| JP | 61-13243 U | | 1/1986 |
| JP | 2-14915 A | | 1/1990 |
| JP | 2-310115 A | | 12/1990 |
| JP | 9-169207 A | | 6/1997 |
| JP | 10-175545 A | | 6/1998 |
| JP | H10-175545 | * | 6/1998 |
| JP | 2010-260398 A | | 11/2010 |

OTHER PUBLICATIONS

Japanese Office Action dated Jul. 8, 2014 issued in corresponding Japanese Patent Appln. No. 2013-517695, with English translation (4 pages).
International Search Report (PCT/ISA/210) mailed on Aug. 30, 2011, by the Japanese Patent Office as the International Searching Authority for International Application No. PCT/JP2011/003073.
Office Action issued on Apr. 27, 2015, by the Chinese Patent Office in corresponding Chinese Patent Application No. 201180071275.9 and an English translation of the Office Action. (14 pages).

* cited by examiner

VEHICLE AIR-CONDITIONING DEVICE

TECHNICAL FIELD

The present invention relates to vehicle air-conditioning devices to be installed in railroad vehicles or the like.

BACKGROUND ART

From the standpoint of global warming, there is a movement to limit the use of chlorofluorocarbon refrigerant, which has high global warming potential. Hence, railroad-vehicle air-conditioning devices that use carbon dioxide refrigerant, which has low global warming potential, have been proposed (see Patent Literature 1, for example). The technique disclosed in Patent Literature 1 relates to an air-conditioning device installed on the ceiling of a railroad-vehicle. The vehicle air-conditioning devices to be installed on the ceiling like this are mainly used in vehicles that are operated at about 130 km/h or less.

On the other hand, in high-speed trains (e.g., the Shinkansen trains and limited express trains), vehicle air-conditioning devices are usually installed under the floor. There is no underfloor vehicle air-conditioning device that uses carbon dioxide as the refrigerant.

CITATION LIST

Patent Literature

Patent Literature 1: Japanese Unexamined Patent Application Publication No. 2010-260398 (see, for example, paragraphs [0010] and [0019] in Description)

SUMMARY OF INVENTION

Technical Problem

In the technique disclosed in Patent Literature 1, when refrigerant leaks into a vehicle due to, for example, aged deterioration of welded pipe joints, the carbon dioxide concentration in the vehicle increases, which may deteriorate users' comfort (i.e., may cause hyperventilation, a feeling of suffocation, etc.).

Furthermore, in an air-conditioning device that uses carbon dioxide refrigerant as in the technique disclosed in Patent Literature 1, because the operating pressure of the carbon dioxide refrigerant is high, refrigerant pipes connecting a compressor, an outdoor heat exchanger, an expansion device, and an indoor heat exchanger need to have 4 to 6 times higher pressure resistance. That is, in the technique disclosed in Patent Literature 1, the thickness of the refrigerant pipes need to be larger than the case where chlorofluorocarbon refrigerant is used.

If the thickness of the refrigerant pipes is large like this, the weight of the air-conditioning device relative to the weight of the vehicle is large, so, the center of gravity of the vehicle is high. This has led to a problem that the vehicle is more likely to be tilted when it rounds a curve at high speed.

The present invention has been made to overcome the above-described problem, and the first object thereof is to provide a vehicle air-conditioning device that can suppress deterioration of users' comfort caused by the leakage of the carbon dioxide refrigerant.

Furthermore, the second object is to provide a vehicle air-conditioning device that can ensure the stability of a running vehicle.

Solution to Problem

A vehicle air-conditioning device of the present invention includes a refrigerant circuit having a compressor, an outdoor heat exchanger, an expansion device, and an indoor heat exchanger that are connected by refrigerant pipes to form a refrigeration cycle; an indoor air-sending device that supplies air to the indoor heat exchanger; and an outdoor air-sending device that supplies air to the outdoor heat exchanger. The refrigerant circuit is installed under the floor of a vehicle and uses carbon dioxide as the refrigerant.

Advantageous Effects of Invention

The vehicle air-conditioning device of the present invention uses carbon dioxide refrigerant, and the refrigerant circuit is installed under the floor of the vehicle. Hence, even if the carbon dioxide refrigerant leaks, an increase in the carbon dioxide concentration in the vehicle can be suppressed because the carbon dioxide has a larger specific gravity than the air.

Furthermore, because the refrigerant circuit is installed under the floor of the vehicle, the center of gravity of the vehicle is low. Thus, the vehicle can stably round a curve at high speed.

DESCRIPTION OF EMBODIMENTS

Embodiments of the present invention will be described below with reference to the drawings.

Embodiment 1

Figure 1:
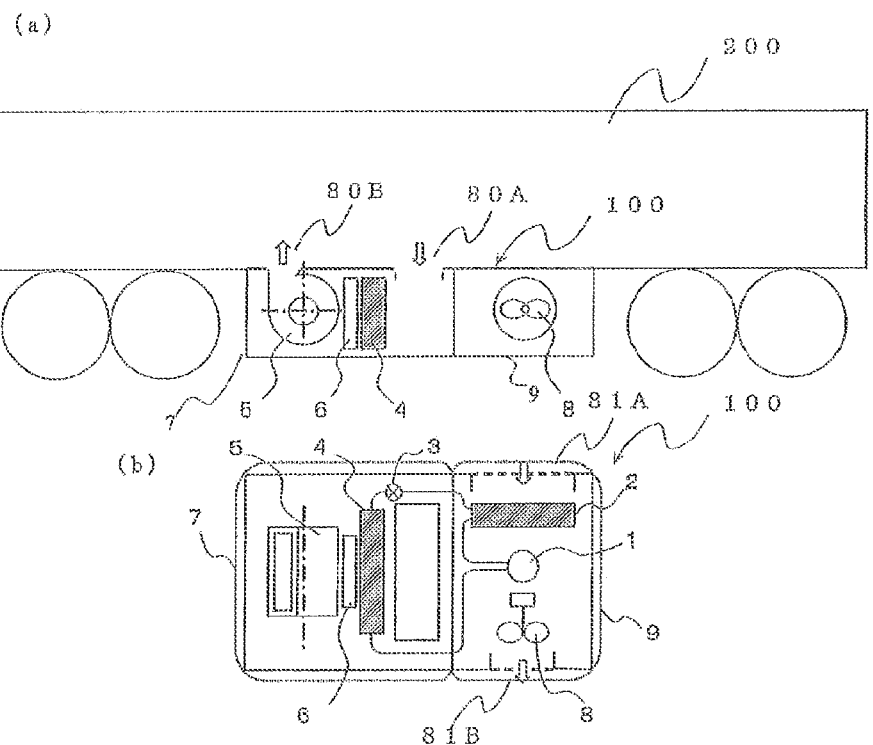
FIG. 1 is a schematic diagram for explaining an exemplary configuration of a vehicle air-conditioning device of Embodiment 1 of the present invention.

FIG. 1 is a schematic diagram for explaining an exemplary configuration of a vehicle air-conditioning device 100 of Embodiment 1 of the present invention. Note that FIG. 1(a) is a vertical sectional view parallel to the travelling direction of a vehicle 200, and FIG. 1(b) is a horizontal sectional view parallel to the travelling direction of the vehicle air-conditioning device 100 illustrated in FIG. 1(a).

As illustrated in FIG. 1(a), the vehicle air-conditioning device 100 of Embodiment 1 is disposed underneath the floor of a vehicle 200 (i.e., under the floor of the vehicle 200). The vehicle air-conditioning device 100 has a first chamber 7 and a second chamber 9, which are separated from each other. That is, air does not flow between the first chamber 7 and the second chamber 9.

Note that FIG. 1 illustrates a case where the vehicle air-conditioning device 100 has a single main body that is separated into the first chamber 7 and the second chamber 9. Herein, it is also possible to configure such that the first chamber 7 and the second chamber 9 are provided in separated units, and the units are connected by a refrigerant pipe.

The first chamber 7 has a substantially enclosed space accommodating various devices and has a first air inlet 80A from which air in the vehicle 200 is introduced and a first air outlet 80B from which conditioned air is discharged. The first chamber 7 has an expansion device 3 that decompresses and expands refrigerant, an indoor heat exchanger 4 that exchanges heat with the air in the first chamber 7, an indoor air-sending device 5 that introduces the air in the vehicle 200 into the first chamber 7 and discharges the air into the vehicle 200, and a heater 6 for heating.

Furthermore, the second chamber 9 has a substantially enclosed space accommodating various devices and has a second air inlet 81A from which outside air is introduced and a second air outlet 81B from which the introduced outside air is discharged. The second chamber 9 has a compressor 1 that compresses the refrigerant, an outdoor heat exchanger 2 that exchanges heat with the outside air introduced in the second chamber 9, and an outdoor air-sending device 8 that introduces the outside air into the second chamber 9 and discharges the air to the outside of the second chamber 9.

Note that FIG. 1 illustrates an example in which the expansion device 3 is disposed in the first chamber 7, and the compressor 1 is disposed in the second chamber 9. The expansion device 3 may be disposed in the second chamber 9, and the compressor 1 may be disposed in the first chamber 7. That is, in the vehicle air-conditioning device 100, at least the indoor air-sending device 5 and the indoor heat exchanger 4 are disposed in the first chamber 7, and at least the outdoor air-sending device 8 and the outdoor heat exchanger 2 are disposed in the second chamber 9.

Configuration of Refrigerant Circuit

Referring to FIG. 1(b), the configuration of a refrigerant circuit of the vehicle air-conditioning device 100 will be described. As illustrated in FIG. 1(b), the refrigerant circuit of the vehicle air-conditioning device 100 is formed of the compressor 1, the outdoor heat exchanger 2, the expansion device 3, and the indoor heat exchanger 4, which are connected in a loop by refrigerant pipes. Note that the vehicle air-conditioning device 100 of this embodiment uses carbon dioxide as the refrigerant.

The compressor 1 sucks the refrigerant, compresses the refrigerant into a high-temperature, high-pressure refrigerant, and delivers the refrigerant to the refrigerant circuit. The compressor 1 is connected to the indoor heat exchanger 4 at a suction side and to the outdoor heat exchanger 2 at a discharge side. The compressor 1 may be formed of, for example, an inverter compressor with a controllable capacity.

The outdoor heat exchanger 2 serves as a condenser (radiator) and performs heat exchange between the refrigerant and the air introduced into the second chamber 9 by a fan of the outdoor air-sending device 8 to condense and liquefy the refrigerant. This outdoor heat exchanger 2 is connected at one end to the compressor 1 and at the other end to the expansion device 3. The outdoor heat exchanger 2 may be formed of, for example, a plate-fin-and-tube heat exchanger that can perform heat exchange between refrigerant flowing through refrigerant pipes and air passing between fins.

The outdoor heat exchanger 2 has the outdoor air-sending device 8 that introduces the outside air into the second chamber 9 and discharges it to the outside of the second chamber 9. Owing to the operation of this outdoor air-sending device 8, the efficiency of the heat exchange in the outdoor heat exchanger 2, between the refrigerant and the outside air, is improved.

The expansion device 3 decompresses and expands the refrigerant. The expansion device 3 is connected at one end to the outdoor heat exchanger 2 and at the other end to the indoor heat exchanger 4. The expansion device 3 may be formed of a device having a controllable opening degree, such as a capillary-tube, an electronic expansion valve, or the like.

The indoor heat exchanger 4 serves as an evaporator and performs heat exchange between the refrigerant and the air in the vehicle 200 introduced in the first chamber 7 by the fan of the indoor air-sending device 5 to evaporate and gasify the refrigerant. This indoor heat exchanger 4 is connected at one end to the expansion device 3 and at the other end to the suction side of the compressor 1. The indoor heat exchanger 4 may be formed of, for example, a plate-fin-and-tube heat exchanger that can perform heat exchange between refrigerant flowing through refrigerant pipes and air passing between fins.

The indoor heat exchanger 4 has the indoor air-sending device 5 that introduces the air in the vehicle 200 into the first chamber 7 and discharges it into the vehicle 200. Owing to the operation of this indoor air-sending device 5, the efficiency of the heat exchange in the indoor heat exchanger 4, between the refrigerant therein and the air in the first chamber 7, is improved.

The heater 6 is provided in the first chamber 7 and heats the air in the vehicle 200 introduced into the first chamber 7 owing to the operation of the indoor air-sending device 5. The heater 6 may be, for example, a panel heater.

Cooling Operation

First, the flow of the refrigerant will be described. In the cooling operation, high-temperature, high-pressure gas refrigerant is discharged from the compressor 1, exchanges heat with the outside air in the outdoor heat exchanger 2, and is condensed into high-pressure, low-temperature liquid refrigerant. This high-pressure, low-temperature liquid refrigerant is expanded by the expansion device 3 into a low-pressure, low-temperature liquid refrigerant. Then, in the indoor heat exchanger 4, this low-pressure, low-temperature refrigerant exchanges heat with the air in the first chamber 7, is evaporated into a low-pressure, normal-temperature refrigerant, and is sucked again by the compressor 1.

Next, the flow of the air will be described. Due to the operation of the outdoor air-sending device 8, outside air is introduced into the second chamber 9 through the second air inlet 81A. The introduced air is heated by the condensation heat of the outdoor heat exchanger 2 and is then discharged from the second chamber 9 through the second air outlet 81B due to the operation of the outdoor air-sending device 8.

The air in the vehicle 200 is introduced into the first chamber 7 through the first air inlet 80A due to the operation of the indoor air-sending device 5. The introduced air is cooled by the evaporation heat of the indoor heat exchanger 4 and is then blown into the vehicle 200 through the first air outlet 80B due to the operation of the indoor air-sending device 5.

Heating Operation

Concerning the heating operation, the compressor 1 is stopped to stop the circulation of the refrigerant, and the indoor air-sending device 5 and the heater 6 are activated. By doing so, the air in the vehicle 200 is introduced into the first chamber 7 through the first air inlet 80A due to the operation of the indoor air-sending device 5. The introduced air is heated by the heat of the heater 6 and is blown into the vehicle 200 through the first air outlet 80B due to the operation of the indoor air-sending device 5.

Note that the heating operation may be performed by reversing the flow of the refrigerant in the cooling operation (this will be described in Embodiment 3).

Threshold Concentration of Carbon Dioxide

The threshold concentration of carbon dioxide that is allowed to leak is smaller than that of chlorofluorocarbon refrigerants, such as R22 and R407C. More specifically, the indicated threshold concentration of the carbon dioxide is 40000 ppm. Once this concentration is reached, typically, hyperventilation is caused, and if such a state lasts for a long time, the oxygen concentration in the air decreases, affecting human bodies.

Although there are no rules related to the carbon dioxide concentration in railroad-vehicle compartments, the carbon dioxide concentration in habitable rooms is restricted to 1000 ppm or less by Article 2 of the Management Standard of Environmental Sanitation for Buildings, in the "Act on Maintenance of Sanitation in Buildings", which is applied to specific buildings, such as libraries and department stores, and is restricted to 5000 ppm or less by Article 3 of the Occupational Safety and Health Act, which is applied to buildings other than specific buildings and having offices.

The above-described laws and regulations are set with respect to the carbon dioxide emitted by human breathing. On the other hand, if the refrigerant leaks from an air-conditioning device installed on the ceiling of a vehicle and using carbon dioxide as the refrigerant, the carbon dioxide concentration in the vehicle may increase due to the refrigerant leakage in addition to the human breathing.

The specific gravity of carbon dioxide with respect to the air under the atmospheric pressure (0 degree(s) C.) is 1.529 (see Chronological Scientific Tables: 1996, P443). That is, because the specific gravity of the concentrated carbon dioxide discharged together with the conditioned air blown out of the ceiling of the vehicle is large, the concentrated carbon dioxide is likely to stay in the vehicle.

Advantage of Vehicle Air-Conditioning Device 100

In the vehicle air-conditioning device 100 of Embodiment 1, even if the carbon dioxide refrigerant leaks, increase in carbon dioxide concentration in the vehicle 200 can be suppressed because the carbon dioxide, which has a larger specific gravity than the air, stays in the first chamber 7 and the second chamber 9.

Furthermore, because the vehicle air-conditioning device 100 of Embodiment 1 is installed under the floor of the vehicle 200, the center of gravity of the vehicle 200 is low. That is, even if the weight of the vehicle air-conditioning device 100 relative to the vehicle 200 is large, the vehicle 200 can stably round a curve at high speed.

Moreover, the first chamber 7 and the second chamber 9 are provided separately. Thus, the conditioned air supplied to the outdoor heat exchanger 2 and the outside air supplied to the indoor heat exchanger 4 are not mixed. That is, the conditioned air is reliably supplied to the vehicle 200. Furthermore, when the carbon dioxide refrigerant leaks from a refrigerant pipe in the second chamber 9, the carbon dioxide refrigerant does not flow into the first chamber 7. Accordingly, it is possible to suppress increase in carbon dioxide concentration in the vehicle 200.

Embodiment 2

Figure 2:
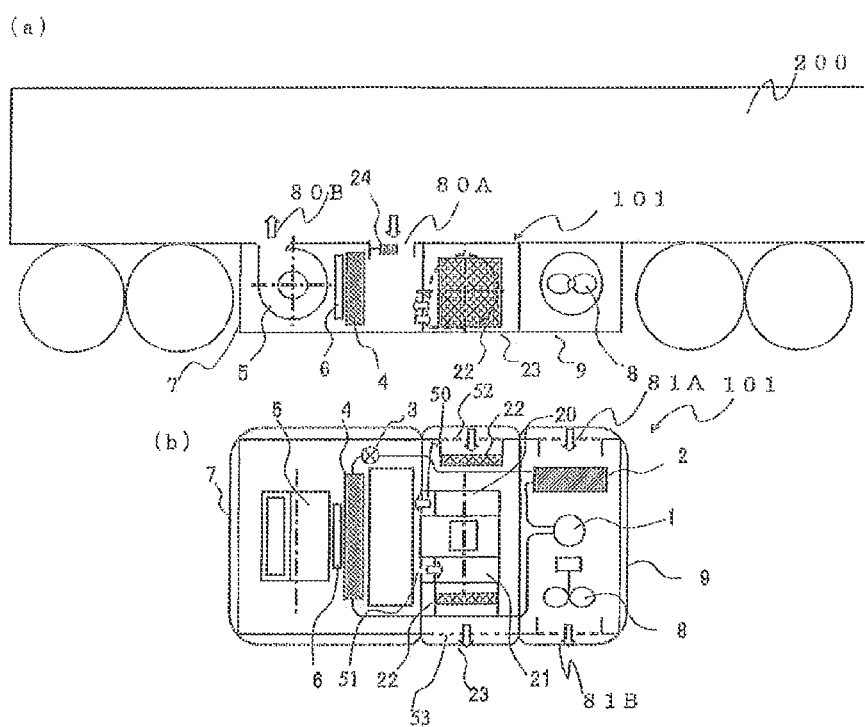
FIG. 2 is a schematic diagram for explaining an exemplary configuration of a vehicle air-conditioning device of Embodiment 2 of the present invention.

FIG. 2 is a schematic diagram for explaining an exemplary configuration of a vehicle air-conditioning device 101 of Embodiment 2 of the present invention. Note that FIG. 2(*a*) is a vertical sectional view parallel to the travelling direction of the vehicle 200, and FIG. 2(*b*) is a horizontal sectional view parallel to the travelling direction of the vehicle air-conditioning device 101 illustrated in FIG. 2(*a*). Furthermore, in Embodiment 2, the same parts as those in Embodiment 1 will be denoted by the same reference numerals, and configurations different from those in Embodiment 1 will be mainly described.

The vehicle air-conditioning device 101 of Embodiment 2 has a third chamber 23 that is provided separately from both the first chamber 7 and the second chamber 9. This third chamber 23 has an air supply duct (not shown) connecting a first opening 52 communicating with the outside of the vehicle 200 and a second opening 50 communicating with the first chamber 7. Furthermore, the third chamber 23 has an exhaust duct (not shown) connecting a fourth opening 53 communicating with the outside of the vehicle 200 and a third opening 51 communicating with the first chamber 7.

Furthermore, the third chamber 23 has a supply ventilation air-sending device 20 that sends air (fresh air) from the outside of the vehicle 200 to the first chamber 7 through the first opening 52, the air supply duct, and the second opening 50. Furthermore, the third chamber 23 has an exhaust ventilation air-sending device 21 that discharges the air in the first chamber 7 to the outside of the vehicle 200 through the third opening 51, the exhaust duct, and the fourth opening 53. Moreover, the third chamber 23 has a ventilation damper 22 that adjusts the amount of air supplied to the first chamber 7 through the air supply duct and the amount of air discharged from the first chamber 7 through the exhaust duct.

Due to the operation of the supply ventilation air-sending device 20, the air outside the vehicle 200 is introduced into the air supply duct through the first opening 52 and is then introduced into the first chamber 7 through the second opening 50. Furthermore, due to the operation of the exhaust ventilation air-sending device 21, the air in the first chamber 7 is introduced into the exhaust duct through the third opening 51 and is then discharged outside the vehicle 200 through the fourth opening 53.

Furthermore, the vehicle air-conditioning device 101 of Embodiment 2 has a carbon dioxide concentration sensor 24 that detects the carbon dioxide concentration in the first chamber 7. The position where this carbon dioxide concentration sensor 24 is disposed is not specifically limited. For example, as illustrated in FIG. 2, the carbon dioxide concentration sensor 24 may be disposed near the first air inlet 80A.

The vehicle air-conditioning device 100 of Embodiment 2 detects the carbon dioxide concentration with the carbon dioxide concentration sensor 24. Then, the detection result is output to the control unit (not shown). Note that the control unit herein adjusts the rotation speed of the compressor 1, the opening degree of the expansion device 3, the operation of the heater 6, the rotation speeds of the fans of the indoor air-sending device 5 and the outdoor air-sending device 8, the angle of the ventilation damper 22, etc.

When the detection result is equal to or higher than a predetermined concentration, the control unit adjusts the angle of the ventilation damper 22 to open the air supply duct and activates the supply ventilation air-sending device 20 to introduce the outside air (fresh air) into the first chamber 7. Moreover, the control unit adjusts the angle of the ventilation damper 22 to open the exhaust duct and activates the exhaust ventilation air-sending device 21 to discharge the carbon dioxide in the first chamber 7.

By doing so, the carbon dioxide staying in the first chamber 7 due to refrigerant leakage can be discharged outside the vehicle 200. That is, it is possible to inhibit the leaking carbon dioxide from flowing into the vehicle 200.

Although FIG. 2 illustrates an example in which the third chamber 23 is provided between the first chamber 7 and the second chamber 9 in an adjoining manner, the configuration is not limited thereto. That is, it is only necessary that the third chamber 23 is connected to the first chamber 7 through the exhaust duct and the air supply duct and is provided such that it can introduce fresh air.

Embodiment 3

Figure 3:
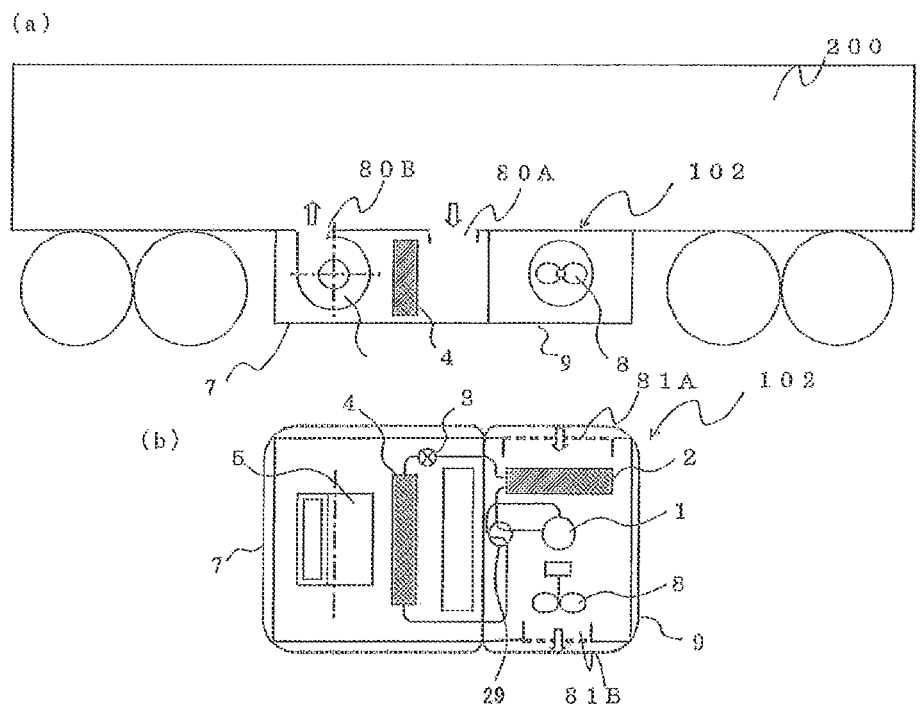
FIG. 3 is a schematic diagram for explaining an exemplary configuration of a vehicle air-conditioning device of Embodiment 3 of the present invention.

FIG. 3 is a schematic diagram for explaining an exemplary configuration of a vehicle air-conditioning device 102 of Embodiment 3 of the present invention. Note that FIG. 3(a) is a vertical sectional view parallel to the travelling direction of the vehicle 200, and FIG. 3(b) is a horizontal sectional view parallel to the travelling direction of the vehicle air-conditioning device 102 illustrated in FIG. 3(a). Furthermore, in Embodiment 3, the same parts as those in Embodiments 1 and 2 will be denoted by the same reference numerals, and configurations different from those in Embodiments 1 and 2 will be mainly described.

In the vehicle air-conditioning device 102 of Embodiment 3, the expansion device 3 is connected to the refrigerant pipe connecting the outdoor heat exchanger 2 and the indoor heat exchanger 4, and a four-way valve 29 that switches the flow path of the refrigerant is provided (heat pump). Note that the vehicle air-conditioning device 102 does not have the heater 6. Note that, in FIG. 3, the expansion device 3 is provided in the refrigerant pipe connecting the outdoor heat exchanger 2 and the indoor heat exchanger 4. Furthermore, the four-way valve 29 is provided in the second chamber 9.

By switching the four-way valve 29, the vehicle air-conditioning device 102 of Embodiment 3 can perform the heating operation without using the heater 6.

Although FIG. 3 illustrates an example in which the expansion device 3 is disposed in the first chamber 7, and the four-way valve 29 is disposed in the second chamber 9, the configuration is not limited thereto. That is, the expansion device 3 may be disposed in the second chamber 9, and the four-way valve 29 may be disposed in the first chamber 7. Furthermore, although FIG. 3 illustrates an example in which one expansion device 3 is connected to the refrigerant pipe connecting the outdoor heat exchanger 2 and the indoor heat exchanger 4, more than one expansion device 3 may be connected thereto.

Commercially available water heaters are formed of a heat pump cycle using carbon dioxide refrigerant, and the COP in the heating operation is about 4.0. On the other hand, when the heater 6 is a panel heater, the COP of the heater 6 is about 1.0, regardless of the type of the refrigerant used. Accordingly, by forming the vehicle air-conditioning device 102 from a heat pump, the power consumption during heating can be reduced.

Embodiment 4

Figure 4:
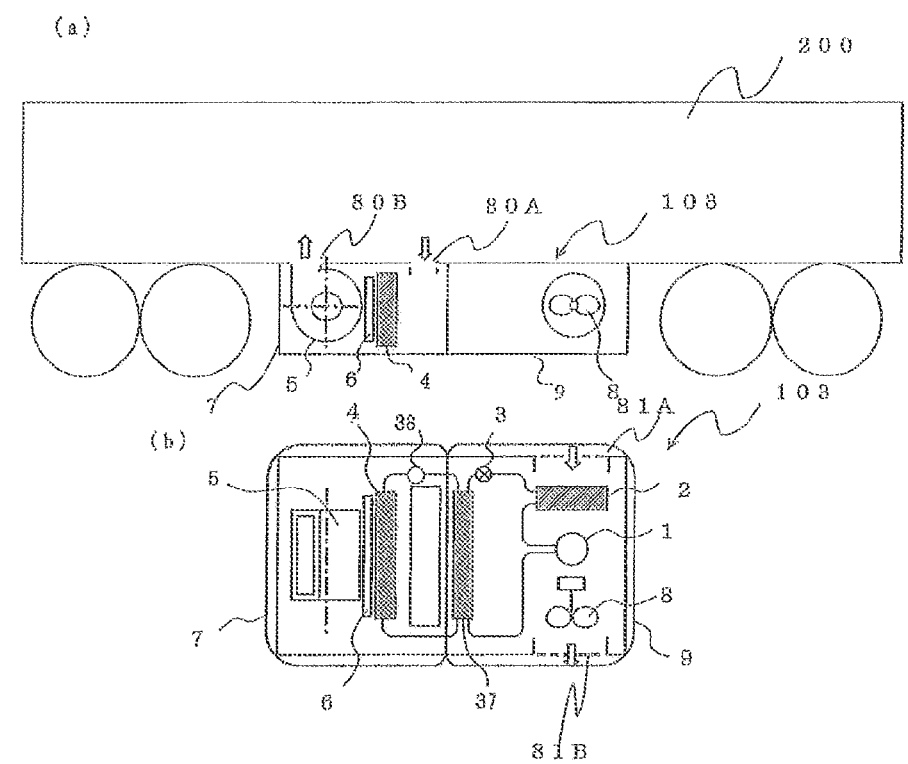
FIG. 4 is a schematic diagram for explaining an exemplary configuration of a vehicle air-conditioning device of Embodiment 4 of the present invention.

FIG. 4 is a schematic diagram for explaining an exemplary configuration of a vehicle air-conditioning device 103 of Embodiment 4 of the present invention. Note that FIG. 4(a) is a vertical sectional view parallel to the travelling direction of the vehicle 200, and FIG. 4(b) is a horizontal sectional view parallel to the travelling direction of the vehicle air-conditioning device 103 illustrated in FIG. 4(a). Furthermore, in Embodiment 4, the same parts as those in Embodiments 1 to 3 will be denoted by the same reference numerals, and configurations different from those in Embodiments 1 to 3 will be mainly described.

In the vehicle air-conditioning device 103, an intermediate heat exchanger 37 that performs heat exchange between the carbon dioxide refrigerant and a heat medium is provided in the second chamber 9, and a pump 38 that transports the heat medium in the heat medium circuit to the first chamber 7 are provided. Note that the pump 38 may be provided in the second chamber 9.

The vehicle air-conditioning device 103 of Embodiment 4 has, in addition to the refrigerant circuit of Embodiment 1, through which the carbon dioxide refrigerant circulates, a heat medium circuit through which refrigerant other than the carbon dioxide refrigerant (hereinbelow, a "heat medium") circulates. That is, the vehicle air-conditioning device 103 of Embodiment 4 includes a first refrigeration cycle (corresponding to the refrigerant circuit) in which the compressor 1, the outdoor heat exchanger 2, the expansion device 3, and the intermediate heat exchanger 37 are sequentially connected, and a second cycle (corresponding to the heat medium circuit) in which the pump 38, the indoor heat exchanger 4, and the intermediate heat exchanger 37 are sequentially connected.

Note that the heat medium may be, for example, water or antifreeze.

As described above, in the vehicle air-conditioning device 103 of Embodiment 4, the refrigerant circuit through which the carbon dioxide refrigerant circulates is disposed in the second chamber 9, which does not communicate with the vehicle 200. Thus, even if the carbon dioxide refrigerant leaks, the carbon dioxide refrigerant flows only into the second chamber 9. More specifically, because the first chamber 7 and the second chamber 9 are separated, the carbon dioxide leaking in the second chamber 9 does not flow into the vehicle 200 via the first chamber 7. Therefore, increase in carbon dioxide concentration in the vehicle 200 is suppressed.

Note that, the vehicle air-conditioning device 103 of Embodiment 4 may have a heat pump cycle by adding an expansion device between the outdoor heat exchanger 2 and the expansion device 3 and adding a four-way valve between the compressor 1 and the intermediate heat exchanger 37.

Embodiment 5

Figure 5:
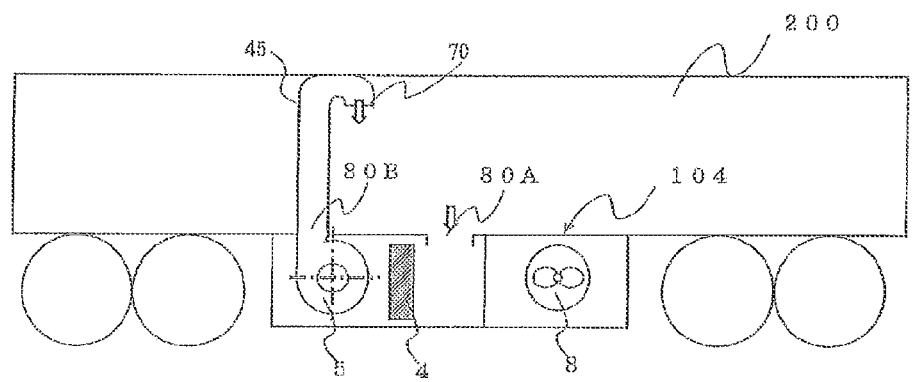
FIG. 5 is a schematic diagram for explaining an exemplary configuration of a vehicle air-conditioning device of Embodiment 5 of the present invention.

FIG. 5 is a schematic diagram for explaining an exemplary configuration of a vehicle air-conditioning device 104 of Embodiment 5 of the present invention. FIG. 5 is a vertical sectional view parallel to the travelling direction of the vehicle 200. Furthermore, in Embodiment 5, the same parts as those in Embodiments 1 to 4 will be denoted by the same reference numerals, and configurations different from those in Embodiments 1 to 4 will be mainly described.

As illustrated in FIG. 5, in the vehicle air-conditioning device 104 of Embodiment 5, an air-outlet duct 45 from which conditioned air blown due to the operation of the indoor air-sending device 5 is blown downward from the ceiling of the vehicle 200 is connected in an airtight manner to the air outlet of the indoor air-sending device 5.

That is, the vehicle air-conditioning device 104 has the air-outlet duct 45 continuous from the first air outlet 80B to the ceiling of the vehicle 200, and the air outlet 70 of the air-outlet duct 45 is oriented downward of the vehicle 200.

Thus, even if the carbon dioxide refrigerant leaks, the carbon dioxide is inhibited from flowing upward in the air-outlet duct 45 and being blown therefrom because the specific gravity of the carbon dioxide is larger than that of the air. That is, it is possible to inhibit the leaking carbon dioxide from staying in the first chamber 7 or the air-outlet duct 45 and flowing into the vehicle 200.

Embodiment 6

Figure 6:
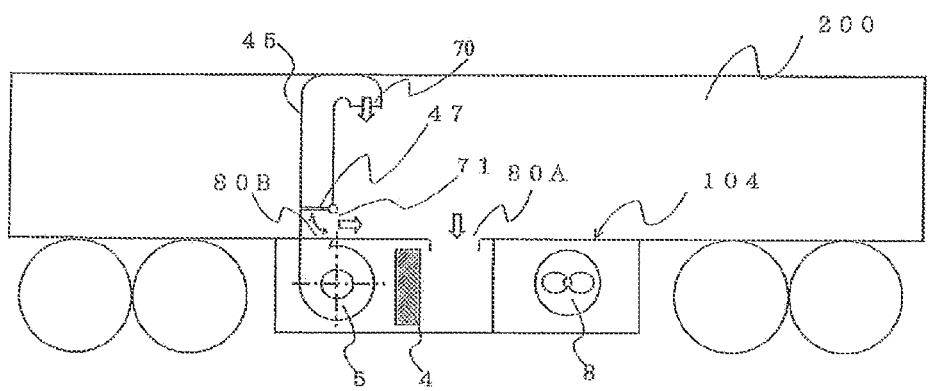
FIG. 6 is a schematic diagram for explaining an exemplary configuration of a vehicle air-conditioning device of Embodiment 6 of the present invention.

FIG. 6 is a schematic diagram for explaining an exemplary configuration of a vehicle air-conditioning device 105 of Embodiment 6 of the present invention. FIG. 6 is a vertical sectional view parallel to the travelling direction of the vehicle 200. Furthermore, in Embodiment 6, the same parts as those in Embodiments 1 to 5 will be denoted by the same reference numerals, and configurations different from those in Embodiments 1 to 5 will be mainly described.

In the vehicle air-conditioning device 105 of Embodiment 6, an air outlet 71 that blows the conditioned air blown out of the indoor air-sending device 5 is formed below the air-outlet duct 45 of Embodiment 5. The air-outlet duct 45 has a switching valve 47 that switches between blowing of the conditioned air from the air outlet 70 and blowing of the conditioned air from the air outlet 71.

Herein, the air density under the atmospheric pressure is 1.293 $kg/m^3$ under a temperature of 0 degree(s) C. and is 1.205 $kg/m^3$ under a temperature of 20 degree(s) C. (see Chronological Scientific Tables: 1996, P443). That is, the air density decreases as the temperature increases. Hence, the control unit switches the switching valve 47 such that the conditioned air is blown out of the air outlet 71 (lower air outlet) in the heating operation and such that the conditioned air is blown out of the air outlet 70 in the cooling operation.

As a result, hot air with low air density, which is produced by the heating operation, is blown out of the lower side of the vehicle 200 and is diffused toward the ceiling in the vehicle 200. Furthermore, cold air with high air density, which is produced by the cooling operation, is blown out downward from the ceiling side and is diffused toward the lower side of the vehicle 200.

That is, the vehicle air-conditioning device 105 of Embodiment 6 can make the temperature distribution in the vehicle 200 more uniform by switching between the height at which the cold air is blown out and the height at which the hot air is blown out, using the switching valve 47. Thus, the sensible temperature difference between the foot and head of the human body is reduced, increasing passengers' comfort.

Note that the configurations disclosed in Embodiments 1 to 6 may of course be appropriately combined.

Reference Signs List 1 compressor; 2 outdoor heat exchanger; 3 expansion device; 4 indoor heat exchanger; 5 indoor air-sending device; 6 heater; 7 first chamber; 8 outdoor air-sending device; 9 second chamber; 20 supply ventilation air-sending device; 21 exhaust ventilation air-sending device; 22 ventilation damper; 23 third chamber; 24 carbon dioxide concentration sensor; 29 four-way valve; 37 intermediate heat exchanger; 38 pump; 45 air-outlet duct; 47 switching valve; 50 second opening; 51 third opening; 52 first opening; 53 fourth opening; 70 air outlet; 71 air outlet; 80A first air inlet; 80B first air outlet; 81A second air inlet; 81B second air outlet; 100 to 105 vehicle air-conditioning device; and 200 vehicle.

The invention claimed is:

1. A vehicle air-conditioning device comprising:
    a refrigerant circuit including a compressor, an outdoor heat exchanger, an expansion device, and an indoor heat exchanger that are connected by refrigerant pipes to form a refrigeration cycle;
    an indoor air-sending device that supplies air to the indoor heat exchanger;
    an outdoor air-sending device that supplies air to the outdoor heat exchanger,
    wherein the refrigerant circuit is installed under the floor of a vehicle and uses carbon dioxide as the refrigerant;
    a first chamber having a first air inlet through which outside air is introduced, and a first air outlet through which air blown out of the indoor air-sending device flows into the vehicle;
    a second chamber having a second air inlet through which air outside the vehicle is introduced, and a second air outlet through which air blown out of the outdoor air-sending device flows out of the vehicle;
    a third chamber having a first opening communicating with an outside of the vehicle, a second opening communicating with the first air inlet for supplying outside air to the first chamber, a third opening communicating with the first air outlet and a fourth opening communicating with the outside of the vehicle for discharging air from the first chamber to the outside of the vehicle,
    wherein the first chamber, the second chamber and the third chamber are provided separately, and the first chamber, the second chamber and the third chamber are disposed underneath the floor of the vehicle,
    wherein the first chamber has at least the indoor air-sending device and the indoor heat exchanger disposed therein, and
    wherein the second chamber has at least the outdoor air-sending device and the outdoor heat exchanger disposed therein; and
    a carbon dioxide sensor provided in the first chamber and detects the carbon dioxide concentration.

2. The vehicle air-conditioning device of claim 1, further comprising:
    an air supply duct through which the outside of the vehicle communicates to the first chamber;
    an exhaust duct through which the first chamber communicates to the outside of the vehicle;
    a supply ventilation air-sending device that sends air from the air supply duct to the first chamber;
    an exhaust ventilation air-sending device that sends air from the first chamber to the exhaust duct;
    at least one ventilation damper that adjusts the flow rate of the air flowing from the air supply duct to the first chamber and the flow rate of the air discharged from the exhaust duct to the outside of the vehicle;
    a control unit that controls the supply ventilation air-sending device, the exhaust ventilation air-sending device, and the ventilation damper according to the detection result of the carbon dioxide sensor,
    wherein, when the carbon dioxide concentration is equal to or higher than a predetermined value, the control unit activates the supply ventilation air-sending device and controls the at least one ventilation damper to open the air supply duct and activates the exhaust ventilation air-sending device and controls the at least one ventilation damper to open the exhaust duct.

3. The vehicle air-conditioning device of claim 1, wherein the refrigerant circuit has a four-way valve.

4. The vehicle air-conditioning device of claim 1, further comprising an air-outlet duct that has an air outlet formed on the ceiling side of the vehicle and connects the air outlet and the first air outlet.

5. The vehicle air-conditioning device of claim 4, wherein the air-outlet duct has a lower air outlet at a position corresponding to the lower side of the vehicle, wherein a switching valve that switches between flowing of the air from the first air outlet to the ceiling side of the air-outlet duct and flowing of the air from the first air outlet to the lower air outlet is provided, and wherein the switching valve is switched such that the air is blown from the first air outlet through the lower air outlet in the heating operation and such that the air is blown from the first air outlet through the air outlet on the ceiling side of the air-outlet duct in the cooling operation.

6. A vehicle air-conditioning device comprising:

a refrigerant circuit including a compressor, an outdoor heat exchanger, an expansion device, and an intermediate heat exchanger that are connected by refrigerant pipes to form a refrigeration cycle;

a heat medium circuit including the intermediate heat exchanger, a pump, and an indoor heat exchanger that are connected by heat medium pipes;

an indoor air-sending device that supplies air to the indoor heat exchanger;

an outdoor air-sending device that supplies air to the outdoor heat exchanger, wherein, in a vehicle air-conditioning device that uses a heat medium other than carbon dioxide as the heat medium in the heat medium circuit, the refrigerant circuit is installed under the floor of a vehicle and uses carbon dioxide as the refrigerant;

a first chamber having a first air inlet through which air in the vehicle is introduced, and a first air outlet through which air blown out of the indoor air-sending device flows into the vehicle;

a second chamber having a second air inlet through which air outside the vehicle is introduced, and a second air outlet through which air blown out of the outdoor air-sending device flows out of the vehicle, and the first chamber and the second chamber are disposed underneath the floor of the vehicle, wherein the first chamber and the second chamber are provided separately, wherein the first chamber has at least the indoor air-sending device and the indoor heat exchanger disposed therein, and wherein the second chamber has at least the outdoor air-sending device, the outdoor heat exchanger, and the intermediate heat exchanger disposed therein; and a carbon dioxide sensor provided in the first chamber and detects the carbon dioxide concentration.

7. The vehicle air-conditioning device of claim 6, further comprising:

an air supply duct through which the outside of the vehicle communicates to the first chamber;

an exhaust duct through which the first chamber communicates to the outside of the vehicle;

a supply ventilation air-sending device that sends air from the air supply duct to the first chamber;

an exhaust ventilation air-sending device that sends air from the first chamber to the exhaust duct;

at least one ventilation damper that adjusts the flow rate of the air flowing from the air supply duct to the first chamber and the flow rate of the air discharged from the exhaust duct to the outside of the vehicle; and a control unit that controls the supply ventilation air-sending device, the exhaust ventilation air-sending device, and the ventilation damper according to the detection result of the carbon dioxide sensor, wherein, when the carbon dioxide concentration is equal to or higher than a predetermined value, the control unit activates the supply ventilation air-sending device and controls the at least one ventilation damper to open the air supply duct and activates the exhaust ventilation air-sending device and controls the at least one ventilation damper to open the exhaust duct.

* * * * *